Figure 2:
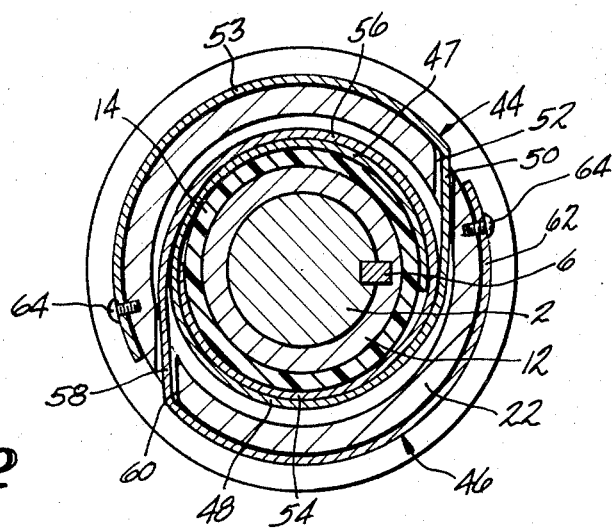

United States Patent [19]
Shum, Jr.

[11] 3,750,784
[45] Aug. 7, 1973

[54] MULTIPLE BAND SPRING CLUTCH
[75] Inventor: John Shum, Jr., Valley Station, Ky.
[73] Assignee: Olin Corporation, New Haven, Conn.
[22] Filed: Dec. 28, 1970
[21] Appl. No.: 101,821

[52] U.S. Cl............................ 192/81 C, 192/107 M
[51] Int. Cl............................................. F16d 41/20
[58] Field of Search............... 192/41 S, 81 R, 81 C, 192/107 R, 107 M, 26, 37, 49

[56] References Cited
UNITED STATES PATENTS

| | | | |
|---|---|---|---|
| 3,019,871 | 2/1962 | Sauzedde | 192/81 C |
| 2,518,453 | 8/1950 | Dodwell | 192/41 S |
| 3,270,845 | 9/1966 | Dodwell | 192/81 R |
| 3,455,423 | 7/1969 | Lindquist | 192/107 R |
| 2,422,533 | 6/1947 | Dodwell | 192/41 S |
| 3,483,955 | 12/1969 | Schell et al. | 192/81 R X |
| 3,117,660 | 1/1964 | Dodwell | 192/41 S |
| 3,266,131 | 8/1966 | Mallory et al. | 192/41 S |

FOREIGN PATENTS OR APPLICATIONS

| | | | |
|---|---|---|---|
| 23,200 | 12/1900 | Great Britain | 192/41 S |

*Primary Examiner*—Manuel A. Antonakas
*Attorney*—Donald R. Motsko, H. Samuel Kieser and William W. Jones

[57] ABSTRACT

A multiple band spring clutch including a rotatable driving member and a rotatable driven member. Two or more band spring members are provided between the driving and driven members of each spring having one end attached to the driven member and its free end coiled about a portion of the outer surface of said driving member.

9 Claims, 2 Drawing Figures

3,750,784

INVENTOR:
JOHN SHUM JR.

BY H. Samuel Kiser
ATTORNEY

MULTIPLE BAND SPRING CLUTCH

This invention relates generally to band spring clutches, and more particularly to band spring clutches of the type which permit the driven member of the clutch to override the driving member.

Although band spring clutches of the type utilizing a spring steel band member between two members to transmit rotary motion are known in the art, the present invention is directed to an improved clutch of this type which overcomes several disadvantages inherent in the prior art devices.

One object of the present invention is to provide a clutch assembly wherein the clutch won't continuously slip when it is subjected to relatively high impact torque.

Another object of the present invention is the provision of a clutch assembly wherein wear is minimized during overrunning of the assembly.

Yet another object of the present invention is the provision of a band clutch assembly wherein stress concentration on the band spring means is minimized.

A further object of the present invention is to provide a clutch assembly wherein the torque load will be applied more evenly to the driven member.

A still further object of the present invention is the provision of a clutch assembly of the spring band type wherein the amount of rotation of the driving member required before complete engagement is reduced.

Still yet another object of the present invention is to provide a band clutch assembly which can be made small in size and manufactured relatively inexpensively.

Figure 1:
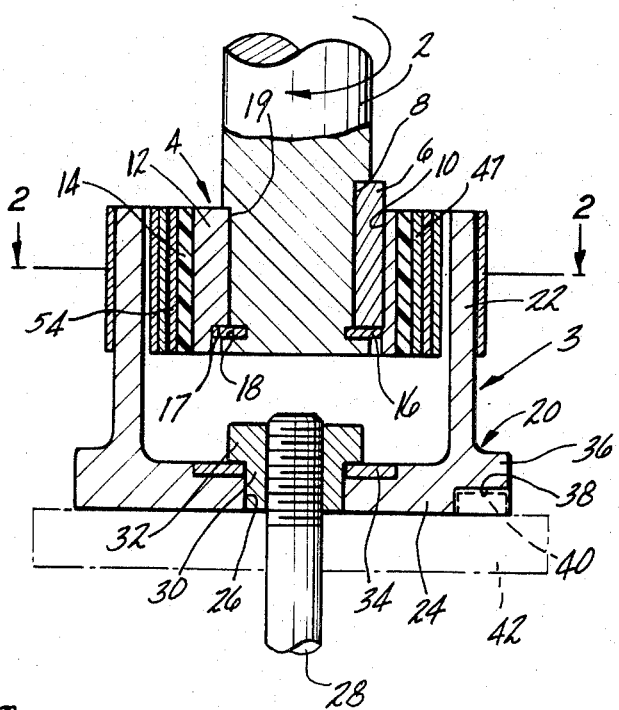

These and other objects and advantages of the present invention will become more apparent by reference to the following description and to the accompanying drawings in which:

FIG. 1 is a cross sectional view of a band spring clutch constructed in accordance with the present invention; and FIG. 2 is a sectional view taken along the lines 2—2 of FIG. 1.

Referring to the drawings, FIG. 1 shows a shaft 2 which may be used to impart the driving force to the clutch assembly 3. In one application of the present invention, the shaft 2 may be part of a starting motor of an engine starting system. The clutch assembly 3 includes a cylindrical member 4 which may be considered the driving member of the clutch assembly. The cylindrical member 4 is keyed to the shaft 2 by key 6 located in a groove 8 in the shaft 2 and a corresponding groove 10 in the driving member 4.

The driving member 4 comprises a hollow, generally cylindrical, metallic element 12 which has a layer of elastomeric material attached to it to form an elastomeric outer surface 14 on the driving member 4. This elastomeric material is preferably natural or synthetic rubber. However, it may be any other elastomeric material which has the requisite properties described below. The driving member 4 is held in position axially by means of a split washer 16 which is mounted in a circumferential groove 18 in the shaft 2 and in abutment with the bottom 17 of a counterbore in the end of the driving member 4, and by a shoulder 19 on the shaft.

A cup-shaped member 20, which may be considered the driven member of the clutch assembly, includes a hollow, cylindrical portion 22 which envelopes and surrounds in spaced relationship the driving member 4.

The end closure portion 24 of the driven member 20 includes an aperture 26 for the reception of a shaft 28 which is threaded onto a flanged bushing 30 mounted in the aperture 26. The flange 32 of the bushing 30 rests on a thrust plate 34 mounted in the inside surface of the end closure 24 of the driven member 20.

The driven member 20 also includes a flange 36 extending circumferentially about the driven member 20 and projecting outwardly from the end closure 24. The outside surface of the end closure 24 and flange 36 have a plurality of notches 38 therein (only one of which is shown in the drawings) to receive lugs 40 which may project from the member to be driven by the clutch assembly indicated by reference numeral 42 in FIG. 1. By way of an example, the member 42 may be the flywheel of an engine when the device is used in an engine starting system.

In the embodiment shown, two band springs 44 and 46, fabricated from spring steel, are used to connect the driving member 4 to the driven member 20. As shown particularly in FIG. 2, the free inside end of band spring 44 is wrapped around the driving member 4 and has a first portion 47 normally in engagement with the elastomeric surface 14 of the driving member 4 for approximately 180°. The second portion 48 of the band spring 44 extends on the outside of band spring 46 for approximately 180° at which point a straight portion 50 extends tangentially from the coiled portion of the spring toward the driven member 20 and passes through a slot 52 in the hollow, cylindrical portion 22. The outer end portion 53 is coiled about the outside surface thereof in the same direction as the inner free end is coiled, i.e. counterclockwise as shown in FIG. 2.

Likewise, the band spring 46 includes a first portion 54 which is coiled about and in engagement with the elastomeric outer surface 14 of the driving member 4 for about 180° until it reaches the end of the spring 48 at which point a second portion 56 is coiled about the outer surface of portion 47 of spring member 44. At a point radially outwardly from its end, spring 46 has a straight portion 58 extending tangentially outwardly, away from the coiled portion toward the driven member 20 and passing through a slot 60 in the cylindrical portion 22 of the driven member 20. The outer end portion 62 is coiled about the outer surface of the cylindrical portion 22 of the driven member 20 in a counterclockwise direction as shown in FIG. 2 and terminates adjacent the location where spring 44 protrudes through the driven member 20. The outside end of both spring members 44 and 46 may be integrally fastened to the driven member 20 by means of rivets or screws 64 or may, alternatively, be soldered, braised or adhesive bonded in place.

It is to be noted that when two springs are used, each spring has a portion in contact with the elastomeric surface 14 of the driving member 4 for approximately 180° and that the slots 52 and 60 in the driven member 20 through which the spring passes are also circumferentially spaced apart 180°. It is to be understood, however, that more than two springs may be used. In such a case, each spring would be in contact with the elastomeric surface over an arc equal to 360° divided by the number of springs and that the slots in the driven member 20 would be spaced apart a similar distance.

With the clutch assembly at rest, the inner loops of both band springs 44 and 46 are in contact with the elastomeric surface 14 of the driving member 4 and adjacent loops of each spring are in contact with each other. When shaft 2 applies a torque to the driving member 4 in the direction indicated by the arrow in FIG. 1, the frictional force between the elastomeric surface 14 and the springs 44 and 46, as well as a frictional force between the two spring members that are in engagement with each other, is such that the torque is transmitted to the springs which in turn transmit it to the driving member 4 such that the driven member 20 will rotate with the driving member 4.

When the driven member 20 is rotated at a speed faster than the driving member 4, as for example when the engine has started in the case where the assembly is used in an engine starting system, the springs 44 and 46 will centrifuge away from the elastomeric surface 14. This disengagement of the band springs 44 and 46 from the elastomeric surface 14 of the driving member 4 avoids undue wear to the assembly during overrunning. When the engine stops, and the spring is no longer subjected to the centrifugal force, the springs 44 and 46 tend to contract to their normal state into gripping relationship on the elastomeric surface 14 ready for another cycle.

It has been found that the use of multiple springs has distinct advantages over the use of a single spring. In some cases, the spring does not return to intimate contact with the driving member when the assembly comes to rest. In such a case, a certain degree of angular rotation of the driving member must take place prior to the time that the spring grips on the surface and the torque is transmitted to the driven member. This results in shock being transmitted throughout the system. The use of a multiple band clutch tends to reduce the amount of angular rotation required to compensate for the fact that the spring does not return to intimate contact with the driven member. Generally it may be said that this degree of rotation is reduced in proportion to the number of springs used.

When the spring transmits the torque to the driven member, bending stresses are imposed on a cylindrical section of the hub because of the discontinuity therein due to the slot through which the spring passes. A multiple band clutch distributes this stress through more than one spring thereby reducing the individual stresses at any given point on the driven member.

What is claimed is:

1. A band spring clutch assembly comprising a rotatable driving member having a cylindrical outer surface of elastomeric material, a rotatable driven member including a hollow cylindrical portion enveloping and surrounding in spaced relationship the elastomeric outer surface of said driving member, at least two band spring members each having one end connected to said driven member and its free end coiled about said elastomeric surface forming a coiled portion, at least a portion of said coiled portion being in frictional engagement with said elastomeric surface when said driving member is driving said driven member.

2. The clutch assembly of claim 1 wherein each band spring is in frictional engagement with said outer surface over an arc substantially equal to 360° divided by the number of band springs.

3. The clutch assembly of claim 2 wherein there are two band springs.

4. The clutch assembly of claim 3 wherein the coiled portion of each spring is about 360°.

5. The clutch assembly of claim 1 wherein said hollow cylindrical portion of said driven member has a plurality of slots therethrough equal to the number of band spring members, each of said band spring members having a portion extending tangentially from said coiled portion through use of said slots and another portion coiled about the outside surface of said driven member in the same direction as the free end is coiled about the driving member, said another portion being attached to said driven member.

6. The clutch assembly of claim 5 wherein said slots in said wall of said driven member are circumferentially spaced from each other 360° divided by the number of band springs.

7. The clutch assembly of claim 6, further including a drive shaft, said driving member comprising a hollow cylindrical member, said drive shaft having a reduced portion forming a shoulder thereon, said reduced portion being received within said driving member with one end of said driving member being in abutment with said shoulder, the other end of said driving member having a counterbore, said reduced portion of said shaft having a circumferential groove therein, a split ring mounted in said groove and being in abutment with the bottom of said counterbore, and key means between said shaft and said driving member for providing a driving connection therebetween.

8. The clutch assembly of claim 6 wherein said driven member includes an end portion, said end portion including means for connecting said driven member to another member.

9. The clutch assembly of claim 1 wherein said elastomer is rubber.

* * * * *